March 1, 1932.  T. G. MOULDING  1,847,439

PRESSURE GAUGE MECHANISM MOUNTING

Filed Oct. 6, 1928

Inventor
Thomas G. Moulding

By Blackmore, Spencer & Flint
Attorneys

Patented Mar. 1, 1932

1,847,439

UNITED STATES PATENT OFFICE

THOMAS G. MOULDING, OF FLINT, MICHIGAN, ASSIGNOR TO A C SPARK PLUG COMPANY, OF FLINT, MICHIGAN, A COMPANY OF MICHIGAN

PRESSURE GAUGE MECHANISM MOUNTING

Application filed October 6, 1928. Serial No. 310,874.

This invention relates to gauges of the Bourdon tube type and has particular reference to the mounting of the Bourdon tube, and the connection of the pressure transmitting member of the gauge to the Bourdon tube.

In prior gauges of the Bourdon tube type, the tube has been connected to a socket or stud which is fastened to the frame or plate which supports the gauge operating mechanism. The end of the socket is suitably slotted or recessed to receive the end of the Bourdon tube which is secured by soldering.

It is the object of the present invention to eliminate the socket or stud by securing the Bourdon tube directly to the frame or plate which supports the gauge operating mechanism.

The object of the invention is accomplished by bending or forming an integral finger at one side of the frame and providing this finger with a pair of integral tongues pressed therefrom and which tongues overlap the end of the Bourdon tube and rigidly secure it to the frame. Solder is preferably added to form a more rigid connection.

In prior constructions the pressure transmitting tube has usually been connected to the conventional stud or socket, but in the present invention this tube is directly connected to the end of the Bourdon tube.

The pressure transmitting or capillary tube has its end bent and inserted in the open end of the Bourden tube. The Bourden tube is then crimped or pressed over the pressure transmitting tube and the end soldered shut, forming a rigid and tight connection between the two tubes.

The casing in which the frame and Bourdon tube are mounted is preferably provided with an outwardly extending sleeve or annular flange through which the pressure transmitting tube projects. If desired, an armor may be provided for the pressure transmitting tube.

As a modification of the invention I may fasten the Bourdon tube directly to a finger bent from the frame without the use of the tongues.

The invention is disclosed on the accompanying drawings in which.

Figure 1:
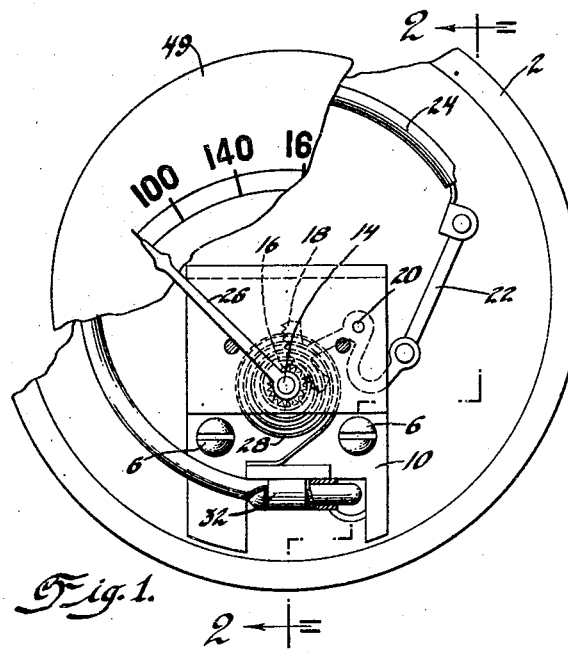
Fig. 1 shows a front view of the gauge with the dial broken away.
Figure 2:
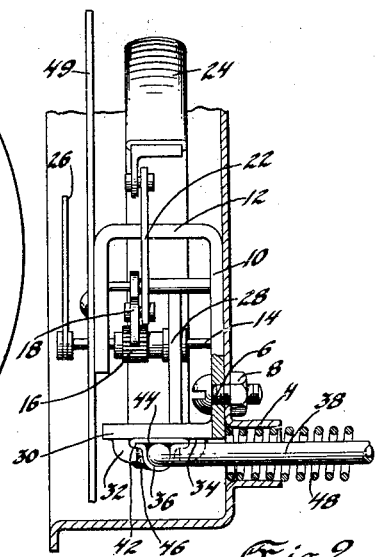
Fig. 2 is a section taken substantially on the line 2—2 of Fig. 1.
Figure 3:
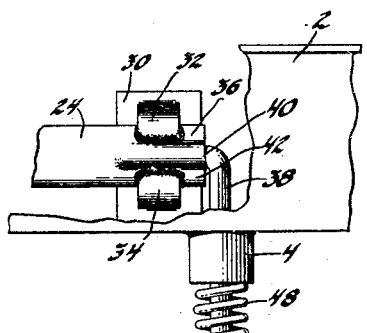
Fig. 3 is a side view of the connection between the Bourdon tube, pressure transmitting tube and the frame.

Referring to the drawings, the numeral 2 indicates the casing of the gauge. This casing has the sleeve or annular flange 4 preferably formed integral with its rear side.

To the bottom of the frame there is rigidly secured by means of the bolts 6 and nuts 8, the integral one piece frame 10 which has one side bent into U-shape as shown at 12 to mount the shaft 14 of the pointer swinging mechanism. The shaft 14 is pivotally mounted in the frame and has secured thereto a gear 16 which meshes with the sector 18 pivoted at 20 and operatively connected by means of a link 22 with the free end of the Bourdon tube 24. To the end of the shaft 14 there is secured the pointer 26. The usual hair spring 28 is provided to return the pointer 26 to its zero position.

The frame or back plate 10 may be supported in any other manner than in the casing as shown, for example, on an instrument panel or board, such as used on automotive vehicles.

The frame 10, preferably at one side, is provided with a finger 30 preferably integral therewith and preferably extending substantially at right angles to the base portion. The finger 30 has pressed therefrom the integral tongues 32 and 34 which project somewhat away from the finger 30 to form a space in which the end 36 of the Bourdon tube is adapted to be inserted.

A pressure transmitting or capillary tube 38 has a bent end 40 which is inserted in the open end 36 of the Bourdon tube 24. After the bent end 40 is inserted in the end 36 of the Bourdon tube, the Bourdon tube is crimped or pressed thereover as shown at 42 and the end soldered shut as shown at 44. The soldering also holds the two tubes together. If desired the end of the Bourdon tube may be suitably formed before the bent end 40 is put in place.

When the tube end is placed in the space between the tongues 32 and the finger 30, the tongues are preferably though not necessarily pressed onto the Bourdon tube and solder applied as shown at 46 to rigidly hold the parts together.

The shank portion of the tube 38 extends outwardly of the casing 2 through the sleeve or annular flange 4 and may be provided with an armored covering 48 and a dial 49 is suitably secured to the frame.

Figure 4:
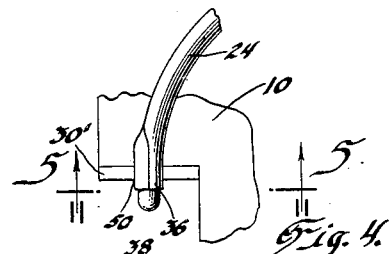
Figs. 4 and 5 are elevational plan and side views of a modification, Fig. 5 being taken substantially on the line 5—5 of Fig. 4.
Figure 5:
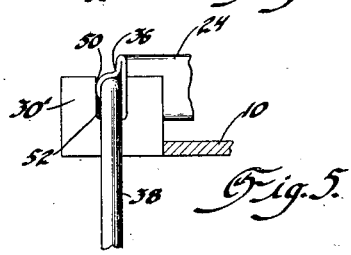

Referring to the species of the Figs. 4 and 5, it will be seen that the frame or plate 10 is provided with an upturned finger 30' which is slotted as at 50 to receive the end 36 of the Bourdon tube 24. Solder, as shown at 52, is applied to rigidly hold the tube end to the finger 30'. The structure of the tube 38 and its application to the end of the Bourdon tube 24 is the same as in the preceding species.

As a result of the invention it will be noted that the usual socket or stud which forms the mounting for the Bourdon tube has been eliminated and the tube mounted directly on the frame supporting the gauge operating mechanism. The usual pressure transmitting tube is also directly connected to the Bourdon tube instead of to the socket as in prior constructions. By making the frame of stamped metal there is obtained a simplified construction, one which is less costly and which may be readily assembled.

I claim:

1. In a gauge, a casing having an outwardly pressed portion, a frame in said casing for mounting the gauge operating mechanism, a finger on said frame, a Bourdon tube mounted on said finger, a tube passing through the pressed-out portion of the casing and having its end mounted in the open end of the Bourdon tube.

2. In a gauge, a casing having an outwardly pressed portion, a frame in said casing for mounting the gauge operating mechanism, a finger on said frame, a plurality of tongues on said finger, a Bourdon tube mounted on said tongues, and a pressure transmitting tube passing through the pressed-out portion of the casing and having its end mounted in the open end of the Bourdon tube.

3. In a gauge, a frame for supporting the gauge mechanism, an integral finger bent from said frame, integral tongues on said finger, a Bourdon tube secured by the tongues, and a pressure transmitting tube secured in the open end of the Bourdon tube and projecting beyond the frame.

4. In a gauge, a casing, a frame in said casing, an integral finger on one edge of said frame and projecting away therefrom, a Bourdon tube mounted on said finger, a pressure transmitting tube passing through the casing and through the frame at the recess formed by bending said finger from said frame, and means securing said pressure transmitting tube in the end of said Bourdon tube.

In testimony whereof I affix my signature.

THOMAS G. MOULDING.